Marco R. Aruta
INVENTOR

Marco R. Aruta
INVENTOR.

Sept. 28, 1965   M. R. ARUTA   3,208,695
AIRCRAFT CAPABLE OF BOTH VERTICAL AND HORIZONTAL FLIGHT
Filed March 16, 1964   5 Sheets-Sheet 3

Marco R. Aruta
INVENTOR.

BY
ATTORNEYS

Sept. 28, 1965  M. R. ARUTA  3,208,695
AIRCRAFT CAPABLE OF BOTH VERTICAL AND HORIZONTAL FLIGHT
Filed March 16, 1964  5 Sheets-Sheet 4

Marco R. Aruta
INVENTOR.

BY
ATTORNEYS

Sept. 28, 1965 M. R. ARUTA 3,208,695

AIRCRAFT CAPABLE OF BOTH VERTICAL AND HORIZONTAL FLIGHT

Filed March 16, 1964 5 Sheets-Sheet 5

Marco R. Aruta
INVENTOR.

BY
ATTORNEYS

United States Patent Office 3,208,695
Patented Sept. 28, 1965

1

3,208,695
AIRCRAFT CAPABLE OF BOTH VERTICAL AND HORIZONTAL FLIGHT
Marco R. Aruta, 1205 Sherwin Ave., Chicago, Ill.
Filed Mar. 16, 1964, Ser. No. 351,974
9 Claims. (Cl. 244—23)

This invention relates broadly to aircraft and more specifically to the type of aircraft which is designed for and is capable of both vertical and horizontal flight.

The present application is a continuation-in-part of my application, Serial No. 187,018, filed April 12, 1962.

There have been numerous efforts directed towards the designing and development of an aircraft that is capable of a vertical take-off and landing operation while also still being able to move in a horizontal flight path. The efforts that have been exerted herebefore toward developing an operational procedure for such an aircraft have, in the majority of instances, been directed toward the use of an aircraft which in a take-off or landing operation usually has the longitudinal axis of the fuselage disposed in a plane normal to the ground so that the aircraft is propelled upwardly in a vertical direction, and, upon reaching the desired altitude, the aircraft is then rotated by means of the propulsion unit or units to assume a horizontal position which is the normal flight altitude of an airplane. In aircraft operations of this type, the greatest difficulty in carrying forth such an operation usually revolves about the turning or rotating of the aircraft from one position to the other position while at the same time maintaining the craft in a proper airborne altitude to prevent same from falling or crashing upon the earth.

The present invention is based upon the concept of maintaining the aircraft in a substantially horizontal position at all times whether the aircraft is moving in a vertical or a horizontal manner. The foregoing is accomplished through a unique and novel control and actuating mechanism that is connected to the power plant or propulsion means which is capable of being rotated with respect to the aircraft from a substantially horizontal position to a vertical position. Such an arrangement readily enables the aircraft to be elevated in a substantially vertical take-off from its landing position to a desired altitude and upon reaching said altitude, the propulsion units may then be rotated from their vertical position to a horizontal position for the purpose of moving the aircraft in a substantially horizontal path of flight. The procedure for landing the aircraft of the present invention would be the reverse of the procedure employed in the take-off operation of the airplane and the manner of changing or varying the direction of flight of the aircraft while moving in a substantially horizontal plane would, in certain instances and under certain circumstances, require that the path of flight of the aircraft be interrupted while the propulsion units were moved from a horizontal position to a vertical position and then rotated while in a vertical position so that when they are once again moved into a horizontal position, they will be able to propel the aircraft in a different horizontal path of flight. While the propulsion means of the present invention have been directed to jet aircraft engines, it should be understood that such a showing is purely for illustrative purposes since other types of thrust-producing units may be employed without departing from the spirit or scope of the present invention.

One of the objects of the present invention is to provide an aircraft having a plurality of propulsion units mounted thereon with means for changing the angular position of said units whereby the aircraft is capable of both vertical and horizontal flight.

2

Another object is to provide an aircraft having a plurality of propulsion units which are capable of being controlled as regards their angular relationship and position with respect to the aircraft for propelling said aircraft in either horizontal or vertical flight.

Another object is to provide an aircraft having a plurality of propulsion units mounted thereon with hydraulic means connected thereto for pivotally moving said units from a horizontal position to a vertical position.

A further object is to provide an aircraft having a plurality of propulsion units mounted thereon with a gear train connected to each unit and operated by a central control member for changing the horizontal position of said propulsion units.

A still further object is to provide an aircraft having thrust-producing units so positioned thereon as to minimize weight and structural stresses, while at the same time, fixing the center of gravity to permit proper flight control and change of direction of flight of the aircraft without materially disturbing the balance of said aircraft.

Other objects and advantages, more or less ancillary to the foregoing in the manner in which all of the various objects are realized, will appear in the following description, which, when considered in connection with the accompanying drawings, sets forth the preferred embodiment of the invention.

Referring to the drawings wherein the preferred embodiment of the invention is illustrated:

Figure 1:
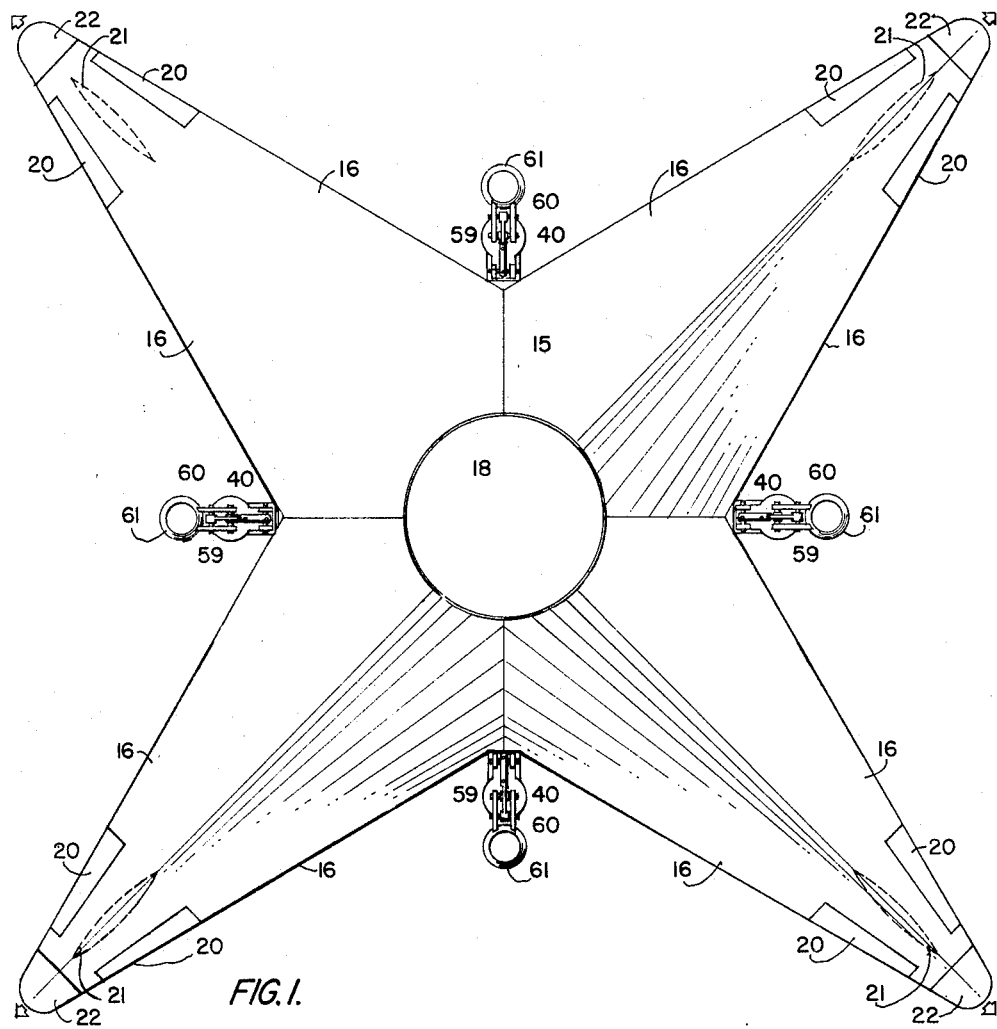
FIGURE 1 is a plan view of an aircraft embodying the present invention.
Figure 2:
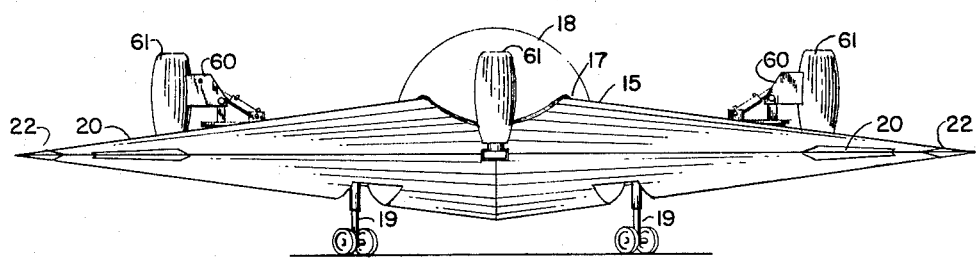
FIGURE 2 is an elevational view of the aircraft shown in FIGURE 1 with the propulsion units being disposed for vertical flight.

Referring to FIGURES 1 and 2 of the drawings, there is shown an aircraft having a fuselage or central body portion 15 from which radiates four wings 16. The fuselage 15 is provided with the conventional flight compartment or cockpit 17 that has associated therewith the conventional plastic canopy or cover 18, while the lower surface of the fuselage has mounted thereon and suspended therefrom in the usual and customary manner, the landing gear 19. The wings 16 are provided on each edge in the outer end portions thereof with ailerons 20 which are of conventional design. The ailerons are operated by the pilot in the usual manner and just which of the various ailerons would be so actuated for controlling the aircraft would be determined from the direction in which the aircraft is being propelled. The wings 16 are each provided with a fin structure 21 intermediate the ailerons 20 and said fins are so mounted in each wing as to be readily concealed within the body of the wing when same is not being used. Thus, one of the fins 21 in one of the wings 16 will be elevated from the surface of the wing and function as a conventional tail fin dependent upon the direction in which the aircraft is being propelled. The outermost ends of the wings 16 are provided with conventional horizontal stabilizers 22.

Figure 3:
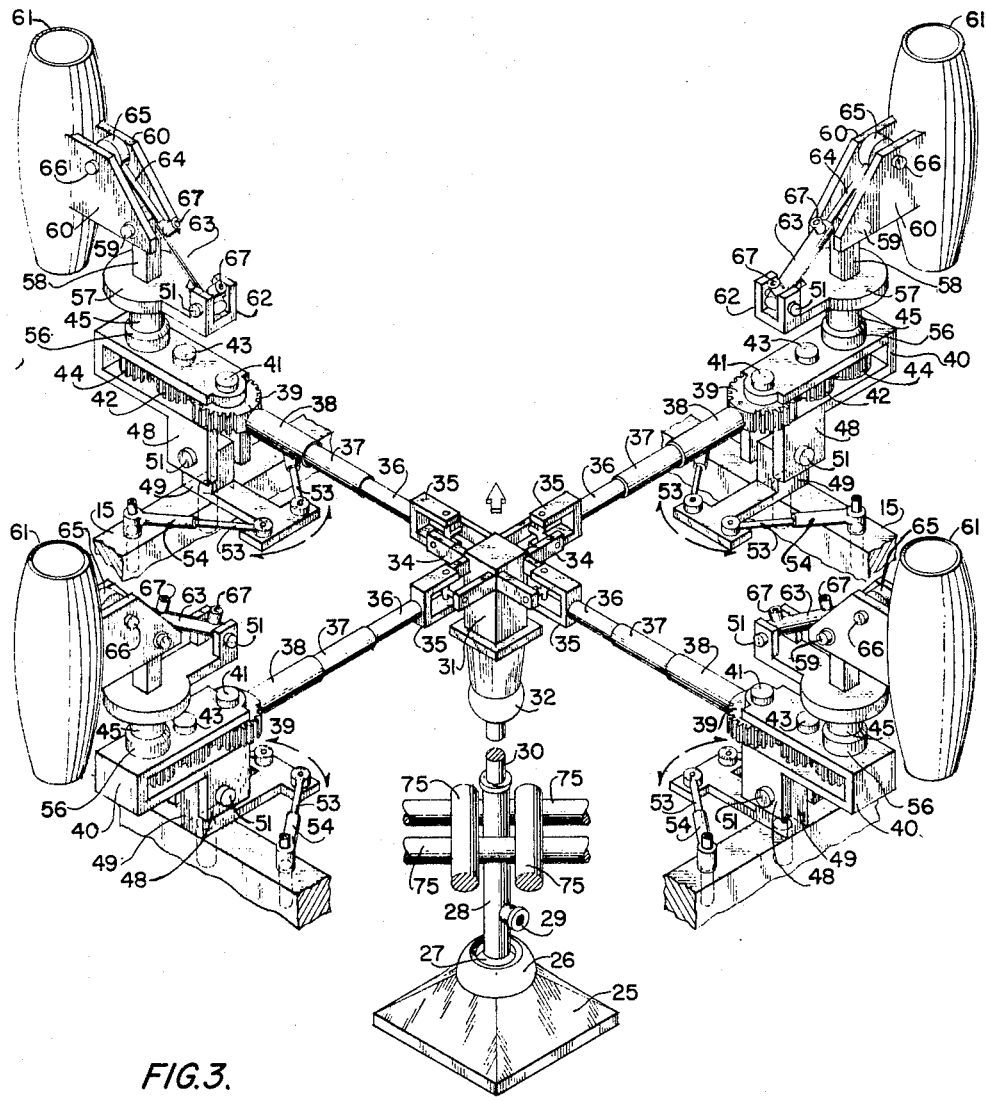
FIGURE 3 is a perspective view showing the propulsion units and the control mechanism for adjusting said units with portions of the aircraft being shown in section in the interest of clarity.

The fuselage 15 has mounted in the flight control compartment 17, in any suitable manner, a base or platform member 25 that is formed with a socket 26 for the reception of a ball 27 mounted on and carried by the lower end of a cylinder 28, FIGURE 3. The cylinder 28 is formed with a fitting 29 that is connected to a source of fluid under pressure, not shown, for the purpose of actuating a piston and piston rod 30 within said cylinder. The piston rod 30 is connected to a vertically extending control member 31 by means of a conventional ball and socket joint 32. The control member 31 is preferably of square configuration and has projecting from each face thereof a bracket 34 which has connected thereto a complementary bracket structure 35. The brackets 34 and 35 are connected to one another in such a manner as to permit universal movement therebetween and with respect to the control member 31. Inasmuch as each of the brackets 34 and 35 are identical in all respects, the following description in the interest of clarity will be restricted to one bracket structure 35 and its associated parts. The bracket 35 has secured thereto one end of a cylinder 36 which is slidably mounted within a cylinder 37 that, in turn, is slidably disposed within a cylinder 38. The cylinder 38 has secured to an end thereof a gear 39 which is mounted in a gear housing 40 by means of a pin 41. The gear 39 in the housing 40 engages a second or intermediate gear 42 mounted on pin 43, and said second gear meshes with a third gear 44 that has secured thereto for rotation therewith a shaft 45 that projects through the upper surface of the housing 40. The lower or bottom surface of the gear housing 40 is provided at its inner end with a pair of spaced depending webs 48 that are positioned on opposite sides of an abutment or boss 49 formed on the outer end of an elongated base member 50. The webs 48 are connected to the boss 49 by means of a pin 51 which provides for a slight pivotal movement of the gear housing 40 with respect to the boss 49, while the base member 50 is formed with a depending shaft 52 that is pivotally mounted in the fuselage 15. The inner ends of the base member 50 has pivotally mounted thereon the ends of a pair of piston rods 53 which are slidably disposed within cylinders 54 that are connected to the fuselage 15 on opposite sides of the mounting of the shaft 52 within the fuselage 15. As shown in FIGURE 1, the four gear housings 40 are mounted on and carried by the fuselage 15 at the point of juncture or mergence of the leading edges of the wings 16. Thus, the gear housings 40 are arranged in diametrically disposed pairs so that a plane through one pair of gear housings will intersect within the flight control compartment 17 a plane through the other pair of gear housings.

The shaft 45 carried by the gear 44 and supported in a bearing collar 56 on the upper surface of the gear housing 40 has secured to the upper end thereof for rotative movement therewith a horizontally disposed plate member 57. The plate 57 has a stud or column 58 affixed to its upper surface in vertical alignment with the shaft 45. The stud 58 has a pin 59 extending therethrough upon which are pivotally mounted a pair of spaced bracket members 60 which have rigidly connected thereto a propulsion unit or power plant 61. The plate 57 is formed at one end thereof with a pair of spaced upwardly extending flanges 62 between which is pivotally mounted a cylinder 63 that has a piston rod 64 extending therefrom. The piston rod 64 terminates in an enlarged boss 65 that is interposed between the bracket members 59 and pivotally secured thereto by a rod 66. The cylinder 63 is provided adjacent its respective ends with suitable ports or nozzles 67 for the introduction of fluid under pressure so as to extend and retract the piston rod 64 with respect to the cylinder 63 and in turn move the brackets 59 and propulsion unit 61 about the pivotal pin 60 carried by the column 58. Thus, upon the introduction of fluid under pressure through the port 67 at the lower end of the cylinder 63, the bracket members 59 and propulsion unit 61 will be moved from the full line position to the dotted line position of FIGURE 4, and conversely returned from the dotted line position to the full line position upon the introduction of fluid through the port 67 at the upper end of the cylinder.

The rotative movement of the shaft 45 and plate 57 is derived from the gear train in the housing 40, which gear train is actuated through the telescopic movement of the cylinders 36–37–38 upon the movement of the control member 31. The member 31 has movement imparted thereto in one direction by means of fluid pressure delivered to the cylinder 28 while movement in other directions is by means of the flight control unit shown in FIGURE 5. The flight control unit includes a pair of housings 70 that contain suitable electric motors and conventional pinion gears, not shown, which are adapted to engage and move along a rack 71 between the abutments 72 that are secured to the fuselage of the aircraft. Thus, dependent upon the direction in which the aircraft is to be flown, the housings 70 will, through the rotation of the pinion gears, be moved in one direction or the other along the racks 71. Inasmuch as the flight control unit is a duplication of parts, the following description will be directed to only one part thereof. The housing 70 has projecting from the upper surface thereof a pin 73 to which is pivotally connected an angularly disposed arm 74. The arm 74 has secured thereto the ends of a rod 75, which is bent in the form of a loop so that parallel portions of the rod will lie on opposite sides of the cylinder 28. The free or looped end portion of the rod 75 is retained between a pair of spaced guide rollers 76 so that as the housing 70 is moved along the rack 71, the looped end of the rod 75 will tend to pivot between and about the guide rollers 76 while being held in proper alignment by said guide rollers.

Figure 4:
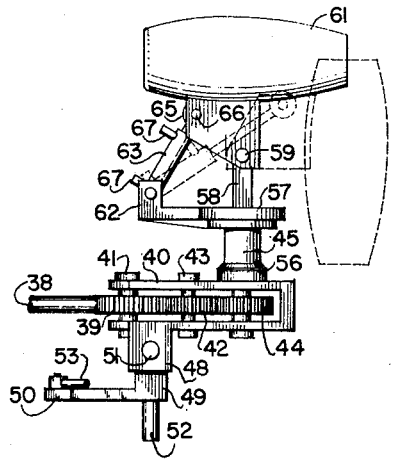
FIGURE 4 is a detailed elevational view of one of the propulsion units and the associated control mechanism therefor.

In the operation of the aircraft embodying the present invention, the propulsion units 61 are rotated about the pin 59 from the full line position to the dotted line position of FIGURE 4 when hydraulic fluid is introduced into the cylinder 63 by way of the inlet port 67 at the lower end of said cylinder for the purpose of extending the piston rod 64 between the bracket members 60. Thus, assuming that there are four propulsion units for the aircraft, the rotation of said units about the pins 59 would place said units in the position as shown in FIGURE 3, and upon said units being energized, the aircraft would be raised from the ground and permitted to climb in a vertical path to the desired altitude. At the time of reaching the desired altitude, the direction of flight of the aircraft in a horizontal path would have already been determined so that the housings 70 of the flight control unit would be moved along their respective racks 71 in order to move the control member 31. If the control member 31 is moved in the direction of the arrow shown in FIGURE 3, it will result in a contraction or telescoping of the cylinders 36–37–38 for the two forward propulsion units 61 while extending the cylinders with respect to the two rearmost propulsion units. This contraction and extension of the cylinders 36–37–38 will result in a movement of the gear trains in the gear housings 40 and a consequent rotation of the shafts 45 and plate members 57 which will cause a rotative movement of said propulsion units while still in their vertical or dotted-line position. When the flight control housings 70 have been moved to the desired position on the racks 71 causing a complementary movement of the control member 31 through the movement of the rods 75 engaging the cylinder 28, the two forward propulsion units 61, FIGURE 3, will move through a relatively small arc or path of movement. This arc or path of movement will be such that if the two forward propulsion units were in a horizontal or full line position, FIGURE 3, their forward or intake ends would be substantially facing one another so that their lines of thrust would be substantially facing one another along a common plane. While the two forward propulsion units are being moved through said arc or path of movement, the two rearmost propulsion units will have been rotated to a point wherein their lines of thrust would be substantially parallel if the two rearmost units were to be moved from their vertical or dotted-line position to a horizontal or full line position. It is to be noted that the shaft 52 functions as a pivot for the base member 50 so that said base member is capable of a pivotal movement with respect to the fuselage 15. The pistons 53 and cylinders 54 are disposed in a suitable hydraulic system which tends to permit this pivotal movement, so that, the adjacent or innermost cylinders 54 and pistons 53 of the two forward propulsion units 61 would be actuated to cause a contraction of the pistons 53 within the cylinders 54 while at the same time, the other cylinders 54 and pistons 53 on the outermost side of the propulsion units 61 would be extended. This movement of the various cylinders 54 and pistons 53 would cause the base members 50 and shaft 52 to pivot with respect to the fuselage and thus, continue the rotative movement of the two forward propulsion units to a position wherein said units would, when moved from a vertical to a horizontal position, be in a position for forward flight in a direction of the arrow of FIGURE 3. Thus, the movement of the control member 31 will result in the two forward propulsion units 61 being rotated through a limited path of movement while at the same time the two rearmost propulsion units 61 will have been rotated to a position, where if they were in a horizontal position, the lines of thrust of said rearmost units would be substantially parallel and said units would be facing in the desired direction of flight. Therefore, the cylinders 54 and pistons 53 associated with the base member 50 and fuselage 15 will, through their hydraulic system, compensate for the limited movement of the two forward units by the control member 31 and continue the rotative movement of said forward units until their lines of thrust would be substantially parallel when the units are moved from a vertical position to a horizontal position for flight in the direction of the arrow of FIGURE 3. After the forward and rearward propulsion units are so moved by the control 31 and cylinders 54 and pistons 53, the propulsion units 61 would then be rotated about the pins 59 to a full line position upon the introduction of hydraulic fluid into the cylinder 63 by way of the ports 67 at the upper end of each cylinder for the purpose of retracting the piston rod.

While the aircraft is in horizontal flight, one of the wings 16 would be regarded as the leading wing and the diametrically opposite wing, FIGURE 1, would be regarded as the trailing wing so that the fin 21 in the trailing wing would then be elevated from its concealed position to function in the conventional manner of a vertical fin, and the ailerons 20 provided on the trailing edge of the other two wings 16 would be operated in the manner that ailerons are so operated. In the event that the horizontal direction of flight of the aircraft has to be changed to a degree greater than that capable of being accomplished through the use of the ailerons, then the propulsion units 61 would be throttled back to a point where it would be safe to rotate them about the pins 59 from their horizontal position to a vertical position and while retaining the aircraft in this position, the control member 31 through the actuation of the housings 70 could be moved to the desired position so as to rotate the shafts 45 and plate members 57 which would result in moving the propulsion units. It would also be necessary to compensate the movement of the control member 31 for the two propulsion units 61 that would constitute the forward pair of propulsion units by actuating the pistons 53 with respect to the cylinders 54 through the hydraulic system in which said pistons and cylinders are connected in order to move the two forward propulsion units to a point wherein their lines of thrust would be substantially parallel to one another when said units are once again returned from their vertical position to a horizontal position and the aircraft could then proceed on its new course of flight. The landing of the aircraft would be carried out in a manner of simply reversing the take-off procedure.

Figure 5:
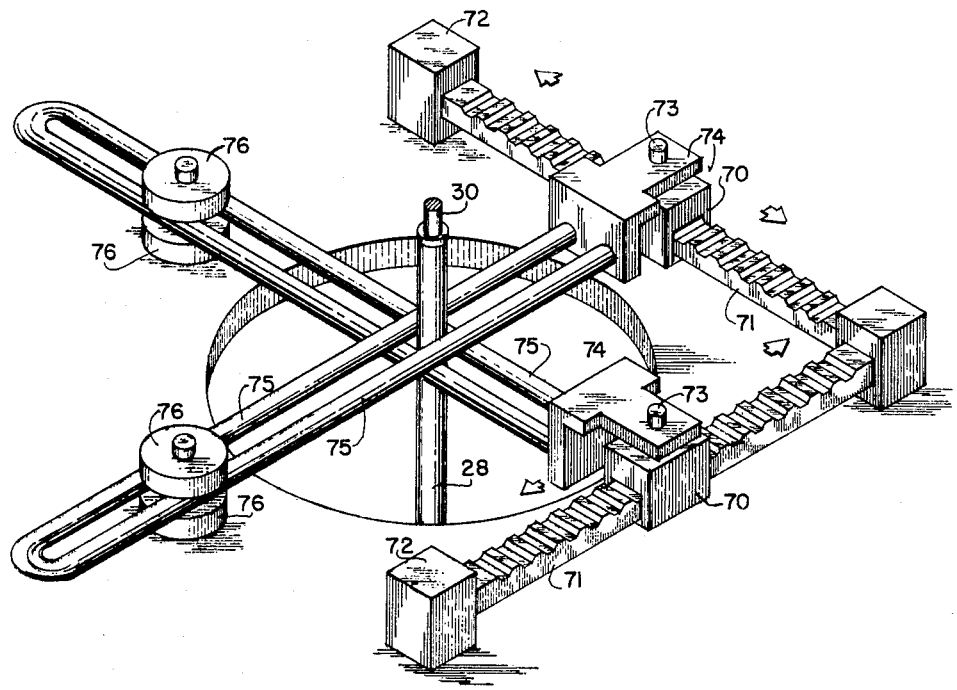
FIGURE 5 is a diagrammatic view of suitable mechanism for actuating the control mechanism illustrated in FIGURE 3.
Figure 6:
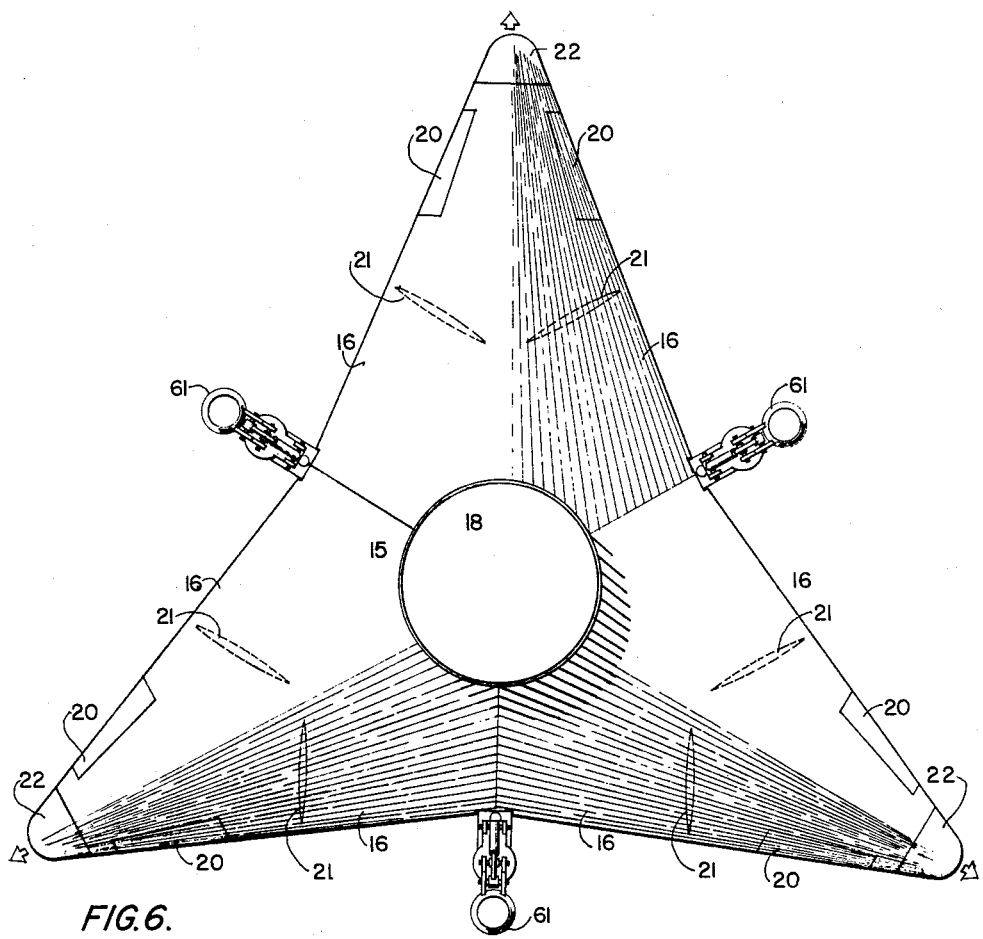
FIGURE 6 is a plan view of another type of aircraft to which the propulsion units and control mechanism of the present invention may readily be adapted.
Figure 7:
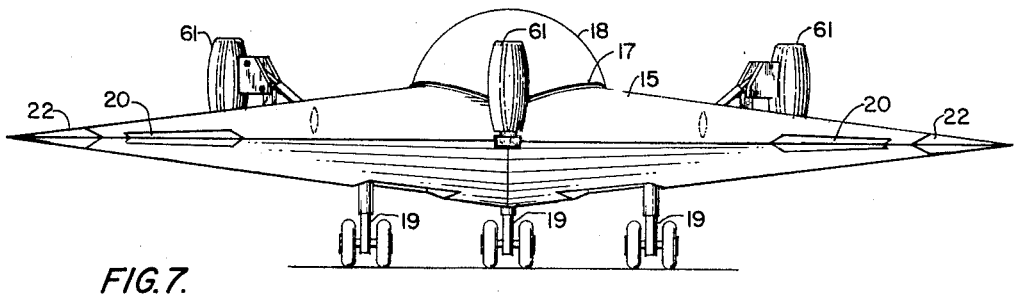
FIGURE 7 is an elevational view of the aircraft shown in FIGURE 6.
Figure 8:
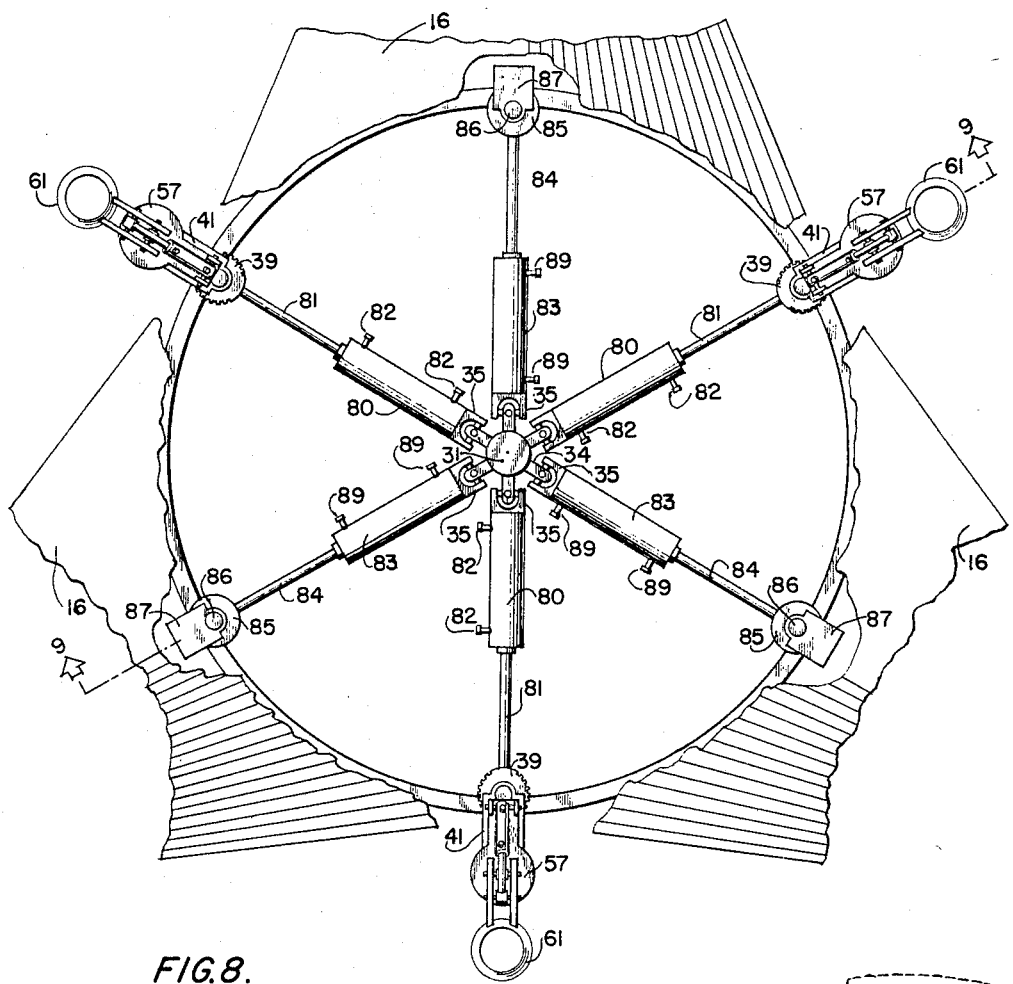
FIGURE 8 is a diagrammatic view showing the control mechanism for the propulsion units for the aircraft shown in FIGURE 6, with portions of said aircraft being broken away in the interest of clarity.
Figure 9:
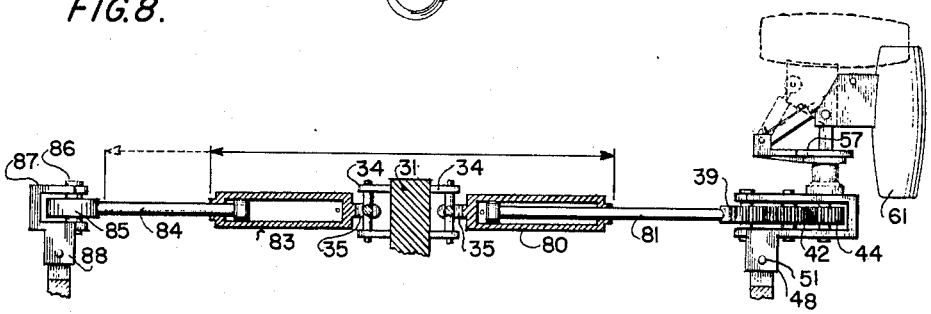
FIGURE 9 is a detailed sectional view of the control mechanism for actuating one of the propulsion units, the view being taken on the line 9—9 of FIGURE 8.

In the modified design of the aircraft shown in FIGURES 6 through 9, the same basic concept is embodied as regards the movement of the propulsion units from a vertical position in which the aircraft would take off and land to a horizontal position for propelling the aircraft in a horizontal path of flight. The design as shown in FIGURES 6 through 9 is directed to an aircraft having three wings in lieu of the one having four wings shown in FIGURES 1 through 3. The three wings or delta wing design of FIGURES 6 through 9 utilizes the same flight control unit as illustrated in FIGURE 5 and the propulsion units 61 carried by the plate 57 are adapted to be moved from the full line to the dotted line position of FIGURE 9 in the same manner as that illustrated in connection with FIGURES 2 and 3. In FIGURES 8 and 9, the control member 31 has a plurality of brackets 34 secured thereto and said brackets are connected to complementary brackets 35 for universal movement with respect thereto. The brackets 35 are carried by the ends of cylinders 80 which have piston rods 81 projecting therefrom that in turn are secured to the gear 39 of the gear train carried in the gear housing 40. The cylinders 80 are provided at their respective ends with inlet nozzles 82 which in turn are connected in a suitable hydraulic system for reciprocating the pistons within said cylinders 80.

The control member 31 has secured thereto on its opposite face but in aligned relation with the cylinder 80, a second cylinder 83, which cylinder has projecting therefrom a piston rod 84 that terminates in a bearing member 85 that is mounted upon a pin 86 carried by the housing 87 which in turn is provided with a depending shaft portion 88 that is pivotally connected to the fuselage 15. The cylinders 83 are provided with suitable nipple connections 89 that are disposed within a hydraulic system for delivering fluid to the respective ends of the cylinders 83 for reciprocating the piston therein.

In the modified or three-wing aircraft shown in FIGURES 6 through 9, the propulsion units 61 are moved from the dotted line to the full line position of FIGURE 9 so that upon energizing said propulsion units, the aircraft may be elevated from the ground in a vertical take-off pattern and permitted to climb to the desired altitude. Upon reaching the desired altitude, the flight control unit housings 70 would be moved along the racks 71 so as to move the control member 31 to the desired position or direction for propelling the aircraft in a horizontal flight path and such movement would result in fluid being introduced into the various cylinders 80 and 83 for the purpose of advancing or retracting the piston rods 81 and 84 in order to rotate the gear train in the housing 40 for the purpose of rotating the shaft 45 and plate member 57 to move the propulsion units to the desired position so that when being rotated from the full line position to the dotted line position of FIGURE 9, said propulsion units would then be arranged in the proper pattern for propelling the aircraft in the desired horizontal flight path, which flight path would utilize one of the wings 16 as being the forward or leading wing of the aircraft.

It is to be noted that in moving the propulsion units in a horizontal plane about the shaft 45, that the propulsion unit diametrically opposite the wing that constitutes the leading wing of the aircraft in its path of flight is not rotated in a horizontal plane about the shafts 45, but said propulsion unit remains in the same plane that it assumed when being moved from the position of vertical take-off to the position of horizontal flight, while the other two propulsion units 61 would, through the rotative action of the gear train in the gear housing 40, be rotated in a horizontal manner about the shaft 45 in order to assume the proper position for propelling the aircraft in the desired horizontal flight path. In the modified design of the aircraft shown in FIGURES 6 through 9, the propulsion units can be moved from one position to another while the aircraft is moving in a horizontal flight path through the movement of the control member 31, and the rotative movement of the gear train in the housings 40 will be compensated for by the movement of the piston rod 84 in and out of its corresponding cylinder 83 and the pivotal movement of the bearing 85 about the pin 86 as the diametrically opposite gear train within the housing 40 is being rotated to move the propulsion unit in a horizontal plane about the shaft 45. It is to be noted in FIGURE 6 that the wings 16 have disposed therein a pair of fins 21 on each side of each propulsion unit 61 so that regardless of which wing would function as the leading wing in the horizontal flight path, there will be provided a pair of vertical fins 21 to aid in maintaining stabilized flight conditions.

Although the foregoing description is necessarily of a detailed character, in order that the invention may be completely set forth, it is to be understood that the specific terminology is not intended to be restrictive or confining and that various rearrangements of parts and modifications of details may be resorted to without departing from the scope or spirit of the invention as herein claimed.

I claim:

1. An aircraft capable of both vertical and horizontal flight comprising a fuselage, a plurality of propulsion units mounted on and carried by said fuselage, means mounted in said fuselage for moving each of said propulsion units to enable each of said units to exert a thrust in a vertical direction and then in a horizontal direction with respect to said fuselage, said means including a shaft having a plate member secured thereto, a gear train connected to said shaft, a supporting column secured to said plate member, a cylinder pivotally mounted on said plate member, a piston rod extending from said cylinder, a pair of brackets pivotally mounted on said supporting column and connected to a propulsion unit, said piston rod connected to said bracket for changing the position of said propulsion unit upon the actuation of said piston rod with respect to said cylinder, and means for driving said gear train to rotate said shaft and plate to change the horizontal position of the propulsion unit with respect to the fuselage.

2. An aircraft capable of both vertical and horizontal flight comprising a fuselage, an elongated base member pivotally mounted in said fuselage, a pair of cylinders and piston rods connected to said fuselage and base member on opposite sides of the pivotal mounting for said base member to retain said base member in a balanced position, a gear housing pivotally supported on said base member, a gear train positioned within said housing, a shaft connected to said gear train for rotation therewith and arranged to extend out of said housing, a plate member connected to said shaft, a propulsion unit pivotally mounted on said plate member, means for moving said propulsion unit from a vertical to a horizontal position, and means for moving said propulsion unit in a horizontal direction with said plate, member, said last-mentioned means including a control member pivotally connected to said fuselage, a plurality of telescoping cylinders interposed between and connected to said control member and gear train for rotating said shaft upon the pivotal movement of said control member.

3. An aircraft according to claim 2 wherein said first-mentioned means includes a cylinder and piston interposed between and connected to said plate member and propulsion unit.

4. An aircraft capable of both vertical and horizontal flight comprising a fuselage, an elongated base member pivotally mounted in said fuselage, a pair of cylinders and piston rods connected to said fuselage and base member on opposite sides of the pivotal mounting for said base member to retain said base member in a balanced position, a gear housing pivotally supported on said base member, a gear train positioned within said housing, a shaft connected to said gear train for rotation therewith and arranged to extend out of said housing, a plate member affixed to the end of said shaft, a supporting column thereon, a propulsion unit connected to said supporting column for pivotal movement thereon, means for moving said plate member and propulsion unit in a horizontal direction including a control member pivotally connected to said fuselage, a plurality of telescoping cylinders interposed between said control member and gear train for rotating said shaft and initially moving said propulsion unit upon the movement of said control member, and means for actuating said cylinders and piston rods for moving said base member to continue the movement of said propulsion unit.

5. An aircraft capable of both vertical and horizontal flight comprising a fuselage, a plurality of propulsion units mounted on and carried by said fuselage, control means mounted in said fuselage for moving each of said propulsion units to enable each of said units to exert a thrust in a vertical direction and then in a horizontal direction with respect to said fuselage, said control means including a gear housing having a gear train therein, a shaft rotatably driven by said gear train, a plate secured to said shaft, a supporting member affixed to said plate, a cylinder pivotally mounted on said plate, a piston rod extending from said cylinder, a rod and link connected to one another in fixed angular relationship, said rod and link at their point of connection being pivotally supported on said column with said rod connected to a propulsion unit and said link connected to said piston rod for changing said propulsion from a horizontal position to a vertical position upon the actuation of said piston with respect to said cylinder and means for driving said gear train to rotate said shaft and plate to change the horizontal position of the propulsion unit.

6. An aircraft capable of both vertical and horizontal flight comprising a fuselage, a plurality of propulsion units mounted on and carried by said fuselage, control means mounted in said fuselage for moving each of said propulsion units to enable each of said units to exert a thrust in a vertical direction and then in a horizontal direction with respect to said fuselage, said control means including for each of said propulsion units a gear housing supported in said fuselage for pivotal movement with respect thereto, a gear train mounted in said gear housing, a shaft rotatably driven by said gear train, a plate member secured to said shaft for movement therewith, a support carried by said plate member for pivotally connecting a propulsion unit thereto, means connected to said support and plate member for pivoting said propulsion unit about said support, means for actuating said gear train to rotate said propulsion unit in a desired direction for moving said fuselage in a horizontal flight, and means for rotating the gears in said gear train.

7. An aircraft capable of both vertical and horizontal flight comprising a fuselage, a plurality of propulsion units mounted on and carried by said fuselage, control means mounted in said fuselage for moving each of said propulsion units to enable each of said units to exert a thrust in a vertical direction and then in a horizontal direction with respect to said fuselage, said control means including for each of said propulsion units a gear housing supported in said fuselage, a gear train mounted in said gear housing, a shaft rotatably driven by said gear train, said shaft connected to a propulsion unit for rotating said unit in a desired direction for moving said fuselage in horizontal flight, a plurality of telescoping cylinders, one of said cylinders connected to a gear in said gear train, another of said cylinders pivotally connected to a supporting member, said supporting member pivotally mounted upon a base member, and means connected to said supporting member for pivoting same with respect to said base member to extend said cylinders to rotate the gears in said gear train to shift each of said propulsion units.

8. An aircraft capable of both vertical and horizontal flight comprising a fuselage, a plurality of propulsion units mounted on and carried by said fuselage with pairs of said units being disposed in substantially opposed relation to one another, control means mounted in said fuselage for moving each of said propulsion units to position said units in a common horizontal plane and in substantially spaced relation with one another for exerting a thrust in the same general direction, said means including a supporting member having a plurality of cylinders pivotally connected thereto, a second cylinder telescopically disposed within each of said cylinders, a third cylinder telescopically disposed within each of said second cylinders, a gear housing mounted in said fuselage, a gear train positioned within said housing, a shaft rotatably driven by said gear train, said shaft connected to a propulsion unit and each of said third cylinders connected to said gear train, said supporting member pivotally mounted upon a base member, and means connected to said supporting member for pivoting same with respect to said base member to extend certain of said second and third cylinders and retract certain of said second and third cylinders to rotate said gear train in said gear housing.

9. An aircraft capable of both vertical and horizontal flight comprising a fuselage, a plurality of propulsion units mounted on and carried by said fuselage with pairs of said units being disposed in substantially opposed relation to one another, control means mounted in said fuselage for moving each of said propulsion units to position said units in a common horizontal plane and in spaced relation with one another for exerting a thrust in substantially the same direction, said means including a supporting member having a plurality of cylinders pivotally connected thereto, a second cylinder telescopically disposed within each of said cylinders, a third cylinder telescopically disposed within each of said second cylinders, a plurality of gear housings mounted in said fuselage, a gear train positioned within each of said housings, a shaft rotatably driven by each of said gear trains, each of said shafts connected to a propulsion unit and each of said third cylinders connected to a gear train, said supporting member pivotally mounted upon a base member, and means connected to said supporting member for pivoting same with respect to said base member to extend certain of said second and third cylinders and retract certain of said second and third cylinders to rotate said gear trains in said gear housings, said supporting member being pivotally connected to a piston rod, said piston rod being positioned within a centrally disposed cylinder and said centrally disposed cylinder being pivotally mounted upon said base member secured to said fuselage, a plurality of pairs of rods positioned about said centrally disposed cylinder with the rod of each pair disposed on opposite sides of said centrally disposed cylinder, one pair of said rods being disposed superjacent the other pair, one end of each pair of rods being secured to an arm with the other end joined together and encompassing a roller carried by said fuselage, means connected to said arm for pivoting said rod about said roller for moving said centrally disposed cylinder about its pivotal connection with said base member contemporaneous with the movement of said supporting member.

References Cited by the Examiner

UNITED STATES PATENTS

| | | | |
|---|---|---|---|
| 1,578,069 | 3/26 | Broyles | 244—56 X |
| 2,939,654 | 6/60 | Coanda | 244—23 |
| 2,974,902 | 3/61 | Schafer | 60—39.34 X |
| 3,096,042 | 7/63 | Prieto | 244—12 |
| 3,099,420 | 7/63 | Messerschmitt et al. | 244—12 |

FOREIGN PATENTS

| | | |
|---|---|---|
| 830,520 | 3/60 | Great Britain. |

MILTON BUCHLER, *Primary Examiner.*

FERGUS S. MIDDLETON, *Examiner.*